United States Patent
Lapic

[19]

[11] Patent Number: 6,113,144
[45] Date of Patent: Sep. 5, 2000

[54] TWO-PIECE UPPER CONTROL ARM AND SPRING MOUNTING BRACKET

[75] Inventor: Stephen M. Lapic, Shillington, Pa.

[73] Assignee: Dana Corporation, Toledo, Ohio

[21] Appl. No.: 09/422,517

[22] Filed: Oct. 21, 1999

[51] Int. Cl.$^7$ .................................................. B62D 7/22
[52] U.S. Cl. .................................... 280/788; 280/124.155
[58] Field of Search ................................... 280/781, 787, 280/788, 124.134, 124.135, 124.141, 124.146, 124.147, 124.154, 124.155; 296/203.1, 204

[56] References Cited

U.S. PATENT DOCUMENTS

| | | | |
|---|---|---|---|
| 3,240,509 | 3/1966 | Pierce | 280/124.134 |
| 3,797,852 | 3/1974 | Patterson et al. . | |
| 4,583,759 | 4/1986 | Kami et al. . | |
| 4,750,755 | 6/1988 | Hayashi et al. . | |
| 5,265,902 | 11/1993 | Lewis . | |
| 5,536,035 | 7/1996 | Bautz et al. . | |
| 5,915,727 | 6/1999 | Bonnville | 280/788 |

*Primary Examiner*—Paul N. Dickson
*Assistant Examiner*—Faye M. Fleming
*Attorney, Agent, or Firm*—MacMillan, Sobanski & Todd, LLC

[57] ABSTRACT

A bracket assembly for supporting both an upper control arm and a spring suspension mechanism in a vehicular body and frame assembly includes a first bracket that is generally U-shaped, including a central portion and a pair of opposed side portions. The central portion of the first bracket has a lower edge that extends generally longitudinally and preferably is shaped to correspond with the shape of an upper surface of a side rail of the vehicle frame assembly. The side portions of the first bracket extend generally perpendicularly relative to the central portion. The bracket assembly further includes a second bracket that is generally formed in the shape of an inverted cup, including an inner central portion, a pair of opposed side portions, and an outer central portion. The inner central portion of the second bracket is sized and shaped to extend adjacent to the central portion of the first bracket. Portions of the first and second brackets are welded together to form the bracket assembly. When so assembled, the first side portion of the first bracket extends generally parallel to the first side portion of the second bracket, and the second side portion of the first bracket extends generally parallel to the second side portion of the second bracket. These two pairs of the side portions form two support structures for pivotably supporting the ends of the upper control arm. The inverted cup-shaped structure of the second bracket provides a structure for receiving and positively retaining the upper end of the suspension spring mechanism therein.

15 Claims, 4 Drawing Sheets

TWO-PIECE UPPER CONTROL ARM AND SPRING MOUNTING BRACKET

BACKGROUND OF THE INVENTION

This invention relates in general to body and frame assemblies for vehicles. More specifically, this invention relates to an improved structure for a two-piece bracket for engaging and supporting a front upper control arm and a front spring in much a vehicle body and frame assembly.

Many land vehicles in common use, such as automobiles, vans, and trucks, include a body and frame assembly that is supported upon a plurality of ground-engaging wheels by a resilient suspension system. The structures of known body and frame assemblies can be divided into two general categories, namely, separate and unitized. In a typical separate body and frame assembly, the structural components of the body portion and the frame portion of the vehicle are separate and independent from one another. When assembled, the frame portion of the assembly is resiliently supported upon the vehicle wheels by the suspension system and serves as a platform upon which the body portion of the assembly and other components of the vehicle can be mounted. Separate body and frame assemblies of this general type are found in most older vehicles, but remain in common use today for many relatively large or specialized use modem vehicles, such as large vans, sport utility vehicles, and trucks. In a typical unitized body and frame assembly, the structural components of the body portion and the frame portion are combined into an integral unit which is resiliently supported upon the vehicle wheels by the suspension system. Unitized body and frame assemblies of this general type are found in many relatively small modem vehicles, such as automobiles and minivans.

As mentioned above, in both separate and unitized types of vehicle frame assemblies, the suspension system resiliently supports the vehicle frame assembly on the rotatable wheels of the vehicle. One type of suspension system commonly used in both automobiles and trucks is an independent suspension system. In an independent suspension system, the vehicle frame assembly is supported individually upon each of the wheels of the vehicle. As a result, each of the wheels can move upwardly and inwardly relative to the vehicle frame assembly independently of the other wheels. Thus, when a bump or a depression in the road upon which the vehicle is operated is encountered by one of the wheels, the other wheels are not moved upwardly and downwardly in response thereto. Accordingly, the independent suspension system provides a relatively smooth ride for an occupant of the vehicle.

A typical structure for an independent suspension system includes an upper control arm and a lower control arm that are connected between the vehicle frame assembly and each wheel of the vehicle. The upper and lower control arms are typically generally V-shaped, each having a pair of inwardly disposed ends that are pivotably supported on the vehicle frame assembly and an outwardly extending intermediate portion that can pivot upwardly and downwardly relative to the vehicle frame assembly. The outwardly extending intermediate portions of the upper and lower control arms are connected to respective ball and socket joints that are, in turn, connected to the upper and lower ends of a generally vertically oriented steering knuckle. Thus, the steering knuckle can move upwardly and downwardly throughout a predetermined range of movement relative to the vehicle frame assembly while maintaining its generally vertical orientation. The ball and socket joints permit rotational steering movement of the steering knuckle relative to the vehicle frame assembly, while accommodating a limited amount of relative angular movement between the upper and lower ends of the steering knuckle and the respective upper and lower control arms connected thereto during such upward and downward range of movement.

A wheel spindle extends generally perpendicularly outwardly from each of the steering knuckles, and a hub and wheel assembly is mounted on the outer end of each of the wheel spindles. Thus, the wheels of the vehicle can also move upwardly and downwardly throughout the predetermined range of movement with the steering knuckle relative to the vehicle frame assembly. During such upward and downward range of movement, the rotational axes of the wheels are maintained generally parallel with the road upon which the vehicle is operated. The ball and socket joints allow the wheels to be steered, while continuing to accommodate this upward and downward range of movement of the wheels relative to the vehicle frame assembly.

At each of the wheels of the vehicle, a spring or other resilient mechanism is usually provided to counterbalance the weight of the vehicle and, therefore, normally maintain the steering knuckle (and the hub and the wheel assembly secured thereto) at an intermediate position relative to the overall range of upward and downward movement allowed by the pivoting control arms. Because of gravity, the weight of the vehicle exerts a force that urges the steering knuckle to move upwardly relative to the vehicle frame assembly. The spring, on the other hand, reacts between the vehicle frame assembly and the lower control arm so as to exert a force that urges the steering knuckle to move downwardly relative to the vehicle frame assembly. The spring forces are designed to counterbalance the weight of the vehicle such that the steering knuckle is normally maintained in the predetermined intermediate position relative to the vehicle frame assembly. When the vehicle is driven over a bump in the road, the upwardly directed force exerted against the wheel temporarily overcomes the force exerted by the spring, allowing the wheel of the vehicle to temporarily move upwardly from this intermediate position until the wheel passes the bump. Similarly, when the vehicle is driven over a depression in the road, the force exerted by the spring causes the wheel of the vehicle to temporarily move downwardly from this intermediate position until the wheel regains full contact with the road. In this manner, a relatively smooth ride is provided for an occupant of the vehicle.

As mentioned above, the inner ends of the upper and lower control arms are pivotably supported on the vehicle frame assembly. In the past, a first pair of control arm mounting brackets has been provided on the vehicle frame assembly to pivotably support the inner ends of the upper control arm, and a second pair of control arm mounting brackets has been provided on the vehicle frame assembly to pivotably support the inner ends of the lower control arm. As also mentioned above, the spring mechanism reacts between the vehicle frame assembly and the lower control arm so as to normally maintain the associated wheel of the vehicle in its predetermined intermediate position relative to the vehicle frame assembly. In the past, a spring mounting bracket has been provided on the vehicle frame assembly to provide a reaction surface for the upper end of the spring mechanism. In many instances, the spring mounting bracket has been mounted on the vehicle frame assembly between the pair of the upper control arm mounting brackets. Although this structure has functioned effectively, it has been found to be somewhat inefficient, inasmuch as it requires that three separate brackets be secured to the vehicle frame assembly. This has been found to unnecessarily increase the weight, cost, and complexity of the vehicle frame assembly. Thus, it would be desirable to provide an improved bracket assembly that is adapted to engage and support both an upper control arm and a spring in such a vehicular body and frame assembly that is lighter, less expensive, and simpler than known structures.

SUMMARY OF THE INVENTION

This invention relates to an improved structure for a bracket assembly that is adapted to engage and support both an upper control arm and a spring suspension mechanism in a vehicular body and frame assembly. The bracket assembly includes a first bracket that is a generally U-shaped member including a central portion and a pair of opposed side portions. The central portion of the first bracket has a lower edge that extends generally longitudinally and preferably is shaped to correspond with the shape of an upper surface of a side rail of the vehicle frame assembly. The side portions of the first bracket extend generally perpendicularly relative to the central portion. The bracket assembly further includes a second bracket that is generally formed in the shape of an inverted cup, including an inner central portion, a pair of opposed side portions, and an outer central portion. The inner central portion of the second bracket is sized and shaped to extend adjacent to the central portion of the first bracket. Portions of the first and second brackets are welded together to form the bracket assembly. When so assembled, the first side portion of the first bracket extends generally parallel to the first side portion of the second bracket, and the second side portion of the first bracket extends generally parallel to the second side portion of the second bracket. The two pairs of the side portions form two support structures for pivotably supporting the ends of the upper control arm. The inverted cup-shaped structure of the second bracket provides a structure for receiving and positively retaining the upper end of the suspension spring mechanism therein.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
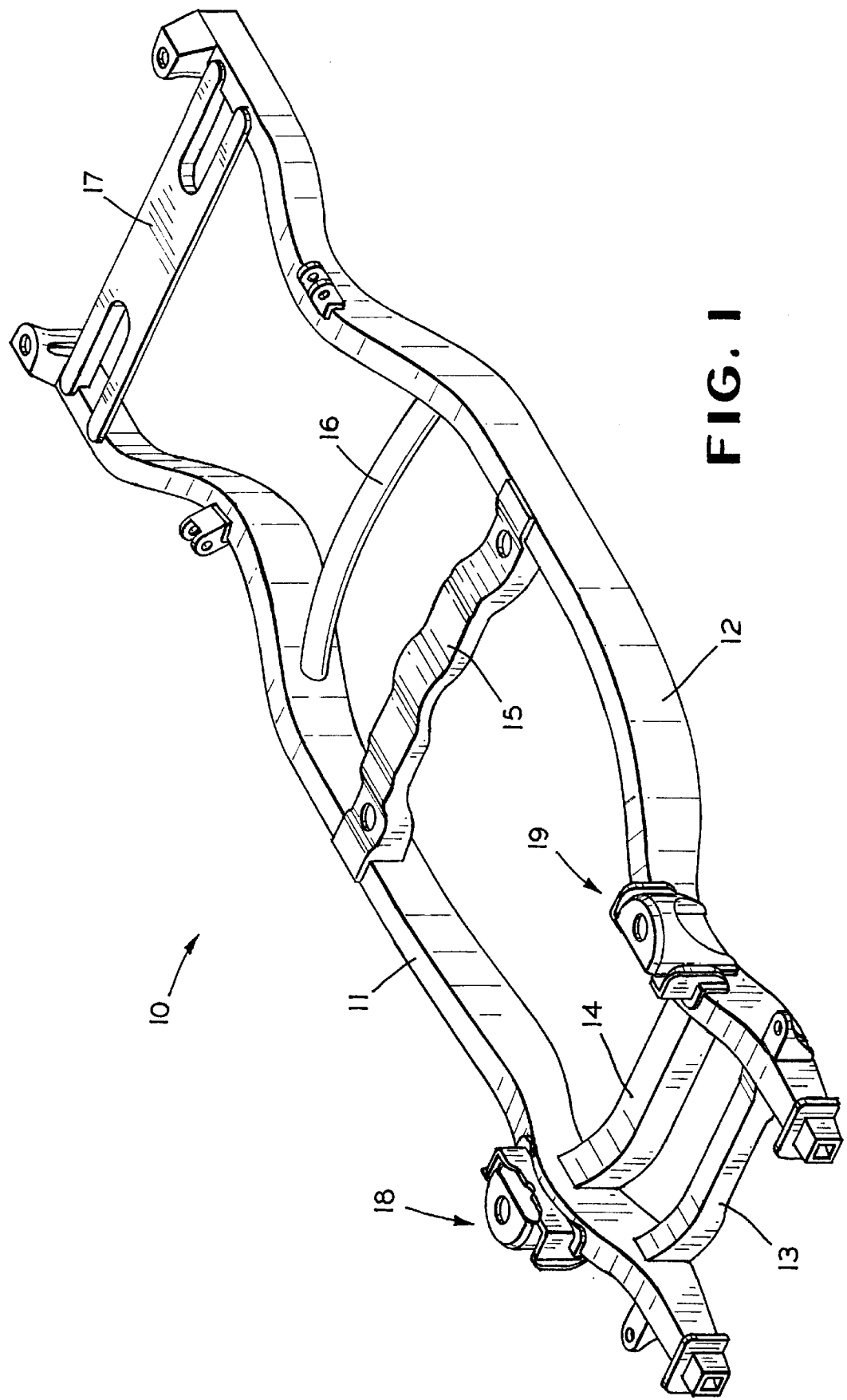
FIG. 1 is a perspective view of a vehicle frame assembly including a two-piece front upper control arm and front spring mounting bracket in accordance with this invention.

Referring now to the drawings, there is illustrated in FIG. 1 a vehicle frame assembly, indicated generally at 10, in accordance with this invention. The vehicle frame assembly 10 is generally conventional in the art, and only those portions thereof that are necessary for a complete understanding of this invention will be described and illustrated. Furthermore, it will be appreciated that the illustrated vehicle frame assembly 10 is intended to be representative of any conventional structure for a frame assembly for use in a vehicle. The illustrated vehicle frame assembly 10 is a ladder frame assembly including a pair of longitudinally extending side rails 11 and 12 or similar structural members having a plurality of transverse cross members 13, 14, 15, 16, and 17 extending therebetween. The side rails 11 and 12 extend longitudinally throughout the entire length of the assembly 10 and are generally parallel to one another. Each of the side rails 11 and 12 in the illustrated embodiment is formed from a single closed channel structural member. However, it will be appreciated that one or both of the side rails 11 and 12 may be formed from a plurality of individually formed closed channel structural members that are secured together by any conventional means, such as by welding, riveting, bolting, and the like. Furthermore, portions of the side rails 11 and 12 may be formed from open channel structural members if desired.

The cross members 13 through 17 extend generally perpendicular to the side rails 11 and 12 and may be formed having any conventional structure. The cross members 13 through 17 are spaced apart from one another along the length of the ladder frame assembly 10 and can be secured to the side rails 11 and 12 by any conventional means, such as by welding, riveting, bolting, and the like. When secured to the side rails 11 and 12, the cross members 13 through 17 provide lateral and torsional rigidity to the ladder frame assembly 10.

A front upper control arm and spring mounting bracket assembly, indicated generally at 18, is provided on the side rail 11, and a similar front upper control arm and spring mounting bracket assembly, indicated generally at 19, is provided on the side rail 12. The illustrated bracket assemblies 18 and 19 are essentially mirror images of one another, both in structure and operation. However, in some instances, the structures of the two bracket assemblies 18 and 19 may vary somewhat to accommodate variations in the shapes of the respective side rails 11 and 12.

Figure 2:
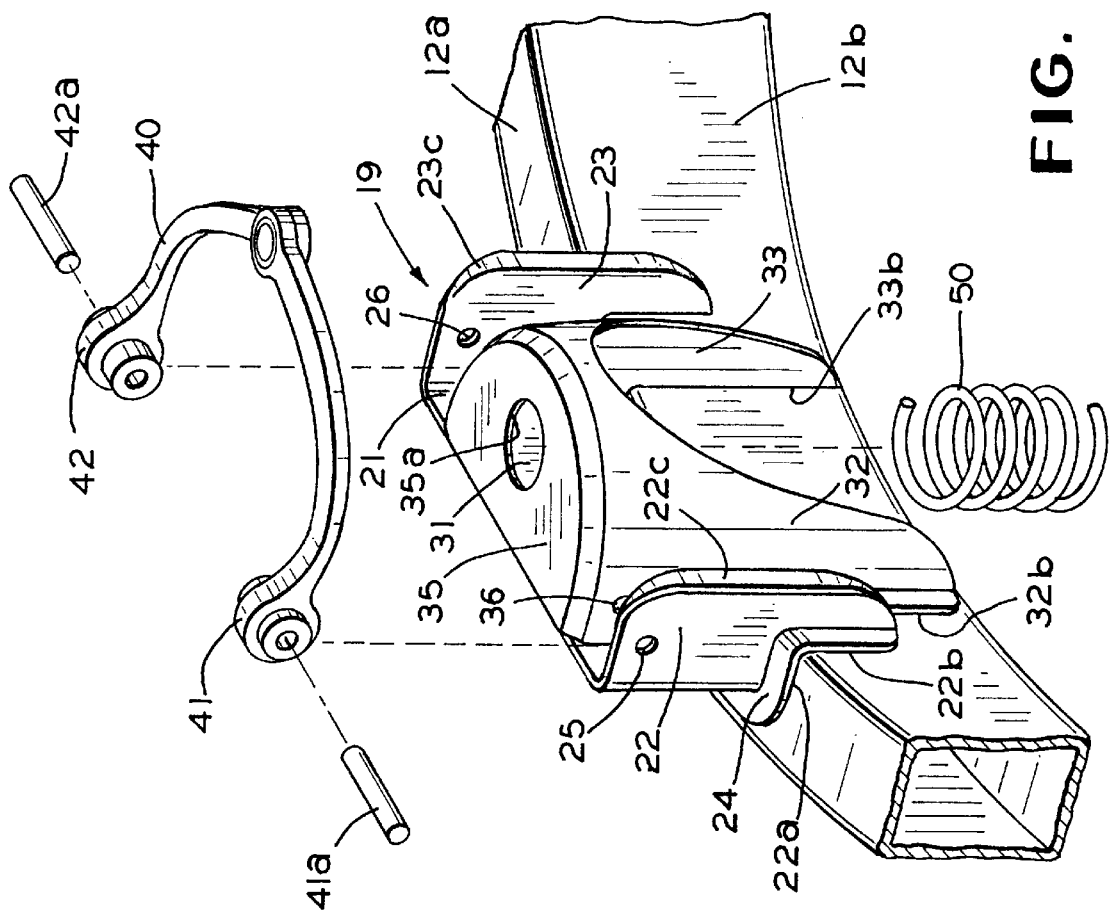
FIG. 2 is an enlarged exploded perspective view of the two-piece front upper control arm and front spring mounting bracket illustrated in FIG. 1, together with an front upper control arm and a front spring adapted to cooperate with the bracket.
Figure 3:
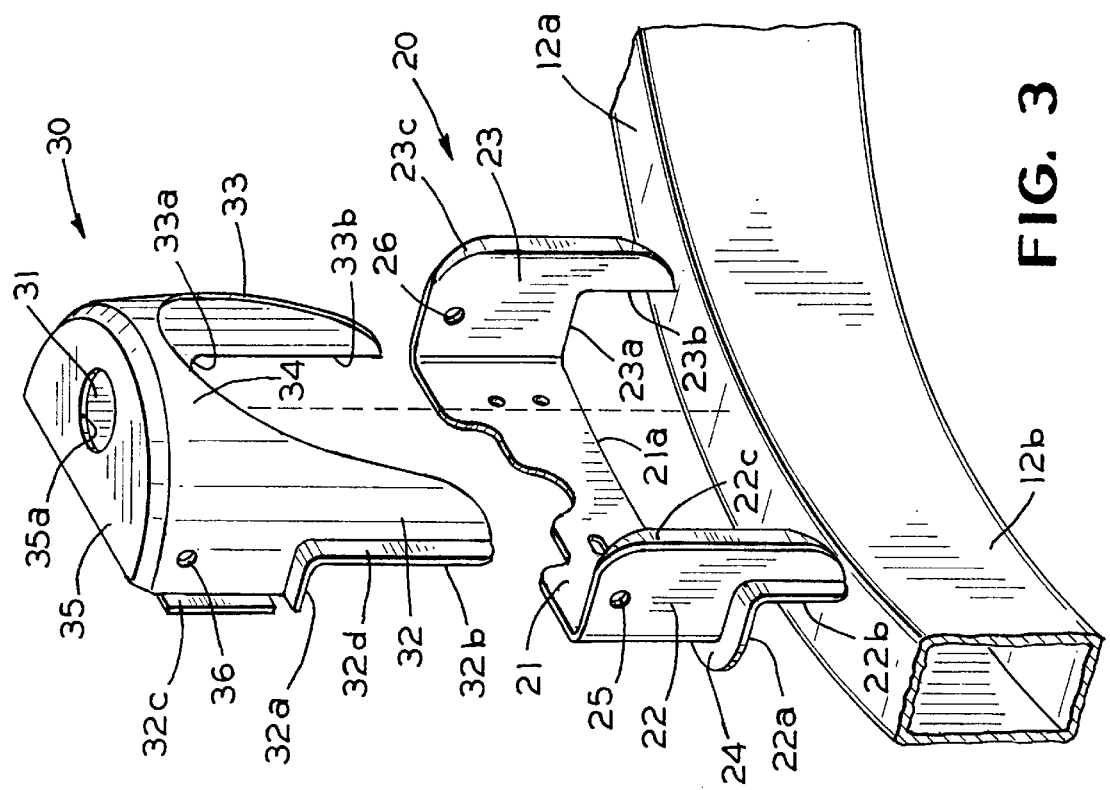
FIG. 3 is an exploded perspective view of the side rail and the two pieces of the front upper control arm and front spring mounting bracket illustrated in FIG. 2.
Figure 4:
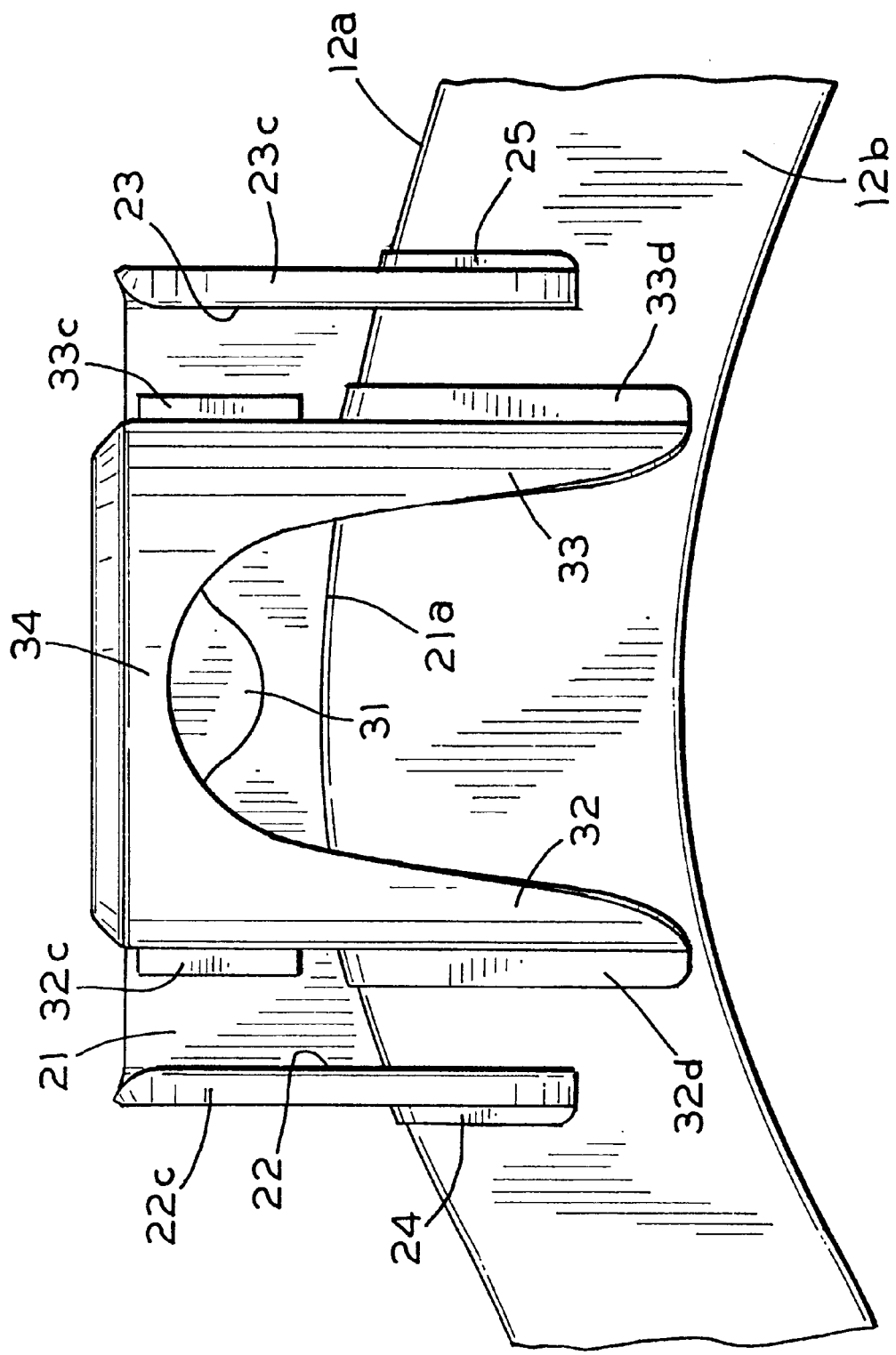
FIG. 4 is a side elevational view of the two-piece front upper control arm and front spring mounting bracket illustrated in FIG. 2.

The structure of one of the bracket assemblies 19 is more clearly illustrated in FIGS. 2, 3, and 4. As shown therein, the bracket assembly 19 includes a first bracket, indicated generally at 20, and a second bracket, indicated generally at 30. As will be explained in detail below, the first and second brackets 20 and 30 cooperate to provide a support structure for both an upper control arm 40 having first and second ends 41 and 42, respectively. The first and second brackets 20 and 30 also cooperate to provide a support structure for a suspension spring mechanism 50. The combined support structure is lighter, less expensive, and simpler than known multiple bracket structures.

As best shown in FIG. 3, the first bracket 20 is a generally U-shaped member including a central portion 21 and a pair of opposed side portions 22 and 23. The first bracket 20 can, if desired, be stamped from a flat piece of a metallic material, such as steel, that is bent or otherwise deformed into the desired shape. The central portion 21 of the first bracket 20 has a lower edge 21a that extends generally longitudinally and preferably is shaped to correspond with the shape of an upper surface 12a of the side rail 12. Thus, the central portion 21 of the first bracket 20 can rest upon and be supported by the upper surface 12a of the side rail 12, as best shown in FIGS. 2 and 4. The side portions 22 and 23 extend generally perpendicularly relative to the central portion 21.

The illustrated side portions 22 and 23 are each formed having a generally inverted L-shaped configuration so as to provide respective generally horizontally extending surfaces 22a and 23a and generally vertically extending surfaces 22b and 23b. Preferably, the generally horizontally extending surfaces 22a and 23a are shaped to correspond with the shape of the upper surface 12a of the side rail 12. Thus, first regions of the side portions 22 and 23 of the first bracket 20 can engage and be supported by the upper surface 12a of the side rail 12, as best shown in FIGS. 2 and 4. Similarly, the generally vertically extending surfaces 22b and 23b are preferably shaped to correspond with the shape of a side surface 12b of the side rail 12. Thus, second regions of the side portions 22 and 23 of the first bracket 20 can engage and be supported by the side surface 12b of the side rail 12, as best shown in FIGS. 2 and 4. If desired, outwardly extending stiffening flanges 22c and 23c can be formed along portions of the upper edges of the side members 22 and 23, respectively. Similarly, a stiffening flange 24 can be formed along some or all of the lower edges of the side members 22 and 23 and the central portion 21 of the first bracket 20. Openings 25 and 26 are respectively formed through the side portions 22 and 23 for a purpose that will be explained below.

As best shown in FIG. 3, the second bracket 30 is generally formed in the shape of an inverted cup, including an inner central portion 31, a pair of opposed side portions 32 and 33, and an outer central portion 34. The second bracket 30 can, if desired, be stamped or drawn from a flat piece of a metallic material, such as steel, that is bent or otherwise deformed into the desired shape. The inner central portion 31 of the second bracket 30 is sized and shaped to extend adjacent to the central portion 21 of the first bracket 20, as best shown in FIG. 4. The side portions 32 and 33 of the second bracket 30 extend generally perpendicularly relative to the inner central portion 31. The outer central portion 34 of the second bracket 30 is somewhat curved and extends between the side portions 32 and 33. The upper portion of the second bracket 30 extending between the side members 32 and 33 can be closed by an upper panel 35. An opening 35a may be formed through the upper panel 34 if desired for a purpose that will be explained below.

The illustrated side portions 32 and 33 are each formed having a generally inverted L-shaped configuration so as to provide respective generally horizontally extending surfaces 32a and 33a and generally vertically extending surfaces 32b and 33b. Preferably, the generally horizontally extending surfaces 32a and 33a are shaped to correspond with the shape of the upper surface 12a of the side rail 12. Thus, first regions of the side portions 32 and 33 of the second bracket 30 can engage and be supported by the upper surface 12a of the side rail 12, as best shown in FIGS. 2 and 4. Similarly, the generally vertically extending surfaces 32b and 33b are preferably shaped to correspond with the shape of the side surface 12b of the side rail 12. Thus, second regions of the side portions 32 and 33 of the second bracket 30 can engage and be supported by the side surface 12b of the side rail 12, as best shown in FIGS. 2 and 4. If desired, outwardly extending stiffening flanges 32c and 33c can be formed along portions of the upper edges of the side members 32 and 33, respectively, of the second bracket 30. Similarly, outwardly extending stiffening flanges 32d and 33d can be formed along some or all of the lower edges of the side members 32 and 33 of the second bracket 30. Openings (one of which is illustrated at 36) are respectively formed through the side portions 32 and 33 of the second bracket 30 for a purpose that will be explained below.

The bracket assembly 19 is formed by initially positioning the first and second brackets 20 and 30 adjacent to one another as shown in FIGS. 2 and 4. When so positioned, the inner central portion 31 of the second bracket 30 extend adjacent to the central portion 21 of the first bracket 20. Thus, the overlapping portions of the inner central portion 31 of the second bracket 30 and the central portion 21 of the first bracket 20 can be secured together, such as by welding. Additionally, the outwardly extending flanges 32c and 33c of the side portions 32 and 33, respectively, of the side members 32 and 33 of the second bracket 30 also extend adjacent to the central portion 21 of the first bracket 20. Thus, the overlapping portions of the outwardly extending flanges 32c and 33c of the second bracket 30 and the central portion 21 of the first bracket 20 can be secured together, such as by welding. As a result, the first and second brackets 20 and 30 are secured together to form the bracket assembly 19.

As best shown in FIGS. 2 and 4, when the first and second brackets 20 and 30 are secured together, the side portion 22 of the first bracket 20 extends generally parallel to the side portion 32 of the second bracket 30. As mentioned above, openings 25 and 36 are respectively formed through the side portion 22 of the first bracket 20 and the side portion 32 of the second bracket 30. These openings 25 and 36 are aligned with one another for a purpose that will be explained below. If desired, the openings 25 and 36 may be perforated through the respective side portions 22 and 32 when each of the brackets 20 and 30 are initially formed. However, it has been found to be desirable to initially assemble and secure the first and second brackets 20 and 30 together in the manner described above. This has been found to facilitate the formation of such openings 25 and 36 in precise locations on the respective side portions 22 and 32 with a minimum of inconvenience.

Similarly, when the first and second brackets 20 and 30 are secured together, the other side portion 23 of the first bracket 20 extends generally parallel to the other side portion 33 of the second bracket 30. The opening 26 formed through the side portion 23 of the first bracket 20 and the opening (not shown) through the side member 33 of the second bracket 30 are also aligned with one another for a purpose that will be explained below. Such openings 26 can be formed in the same manner as described above in connection with the openings 25 and 36.

Once assembled, the bracket assembly 19 is then secured to the side rail 12. This is accomplished by disposing the bracket assembly 19 in abutment with the side rail 12 as shown in FIGS. 2 and 4. In this position, the lower edge 21a of the central portion 21 and the generally horizontally extending surfaces 22a and 23a of the side members 22 and 23 of the first bracket 20 abut the upper surface 12a of the side rail 12. At the same time, the generally vertically extending surfaces 22b and 23b of the side members 22 and 23 of the first bracket 20 abut the side surface 12b of the side rail 12. Accordingly, portions of the first bracket 20, including some or all of the central portion 21 and the flange 24 can be secured to the side rail 12 in any conventional manner, such as by welding. Similarly, when the bracket assembly 19 in disposed in abutment with the side rail 12, the generally horizontally extending surfaces 32a and 33a of the side members 32 and 33 of the second bracket 30 abut the upper surface 12a of the side rail 12, and the generally vertically extending surfaces 32b and 33b of the side members 32 and 33 of the second bracket 30 abut the side surface 12b of the side rail 12. Accordingly, portions of the second bracket 30, including some or all of the flanges 32d and 33d can be secured to the side rail 12 in any conventional manner, such as by welding. Consequently, the bracket assembly 19 is secured connected to the side rail 12.

As mentioned above, the first side portion 22 of the first bracket 20 extends generally parallel to the first side portion 32 of the second bracket 30, and the second side portion 23 of the first bracket 20 extends generally parallel to the second side portion 33 of the second bracket 30. The pair of first side portions 22 and 32 together form a first support structure for the first end 41 of the upper control arm 40. As shown in FIG. 2, the first end 41 of the upper control arm 40 is adapted to be disposed between the pair of first side portions 22 and 32 and retained therein by a conventional retainer pin 41a or similar structure that extends through the aligned openings 25 and 36 and through an opening formed through the first end 41 of the upper control arm 40. As a result, the first end 41 of the upper control arm 40 is pivotably connected to the bracket assembly 19 and, consequently, to the vehicle frame assembly 10.

Similarly, the pair of second side portions 23 and 33 together form a second support structure for the second end 42 of the upper control arm 40. As shown in FIG. 2, the second end 42 of the upper control arm 40 is adapted to be disposed between the pair of second side portions 23 and 33 and retained therein by a conventional retainer pin 42a or similar structure that extends through the aligned openings 26 and through an opening formed through the second end 42 of the upper control arm 40. As a result, the second end 42 of the upper control arm 40 is pivotably connected to the bracket assembly 19 and, consequently, to the vehicle frame assembly 10.

As mentioned above, the second bracket 30 is generally formed in the shape of an inverted cup. This structure is desirable because it provides a structure for receiving and positively retaining the upper end of the suspension spring mechanism 50 therein. Depending upon the specific requirements of the vehicle, a portion of the is suspension spring mechanism 50 (not shown) may extend upwardly from the bracket assembly 19. The opening 35a formed through formed through the upper panel 35 of the second bracket 30 is provided to allow such portion of the suspension spring mechanism 50 to extend therethrough if necessary.

The bracket assembly 19 of this invention is desirable over known mounting brackets structures for several reasons. As discussed above, vehicle frame assemblies have traditionally used three brackets, two for pivotably supporting the ends of the upper control arm 40 and one for receiving the upper end of the suspension spring mechanism 50. This has been found to unnecessarily increase the weight, cost, and complexity of the vehicle frame assembly. The two-piece design of this invention has been found to be lighter, less expensive, and simpler than known structures. Furthermore, the two-piece design of this invention has been found to desirably disperse the loads that are created by the upper control arm 40 and the suspension spring mechanism 50 much more evenly over a wider surface of the side rail 12. This improves the overall stress and durability of the bracket assembly 19.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A combined frame assembly and suspension system for a vehicle comprising:

a vehicle frame assembly including a structural member;

a bracket assembly secured to said structural member, said bracket assembly including a first bracket having a central portion and first and second side portions and a second bracket including a central portion and first and second side portions, said first side portion of said first bracket and said first side portion of said second bracket defining a first support structure, said second side portion of said first bracket and said second side portion of said second bracket defining a second support structure; and a control arm having a first end that is pivotably connected to said first support structure and a second end that is pivotably connected to said second support structure.

2. The combined frame assembly and suspension system defined in claim 1 wherein said first and second side portions of said first bracket extend generally perpendicularly relative to said central portion.

3. The combined frame assembly and suspension system defined in claim 1 wherein said first and second side portions of said second bracket extend generally perpendicularly relative to said central portion.

4. The combined frame assembly and suspension system defined in claim 1 wherein said first and second side portions of said first bracket extend generally perpendicularly relative to said central portion, and wherein said first and second side portions of said second bracket extend generally perpendicularly relative to said central portion.

5. The combined frame assembly and suspension system defined in claim 1 wherein said central portion of said second bracket is a first central portion, and wherein said second bracket includes a second central portion that extends between said first and second side portions thereof.

6. The combined frame assembly and suspension system defined in claim 5 wherein said first central portion of said second bracket is secured to said central portion of said first bracket.

7. The combined frame assembly and suspension system defined in claim 1 wherein said first support structure has a pair of aligned openings formed therethrough, said first end of said control arm has an opening formed therethrough, and further including a retainer extending through said aligned openings formed through said first support structure and said opening formed through said first end of said control arm to pivotably connect said first end of said control arm to said first support structure.

8. The combined frame assembly and suspension system defined in claim 7 wherein said second support structure has a pair of aligned openings formed therethrough, said second end of said control arm has an opening formed therethrough, and further including a retainer extending through said aligned openings formed through said second support structure and said opening formed through said second end of said control arm to pivotably connect said second end of said control arm to said second support structure.

9. The combined frame assembly and suspension system defined in claim 1 wherein central portion of said first bracket includes an edge that abuts a surface of said structural member.

10. The combined frame assembly and suspension system defined in claim 1 wherein said first and second side portions of said first bracket include respective surfaces that engage portions of a surface of said structural member.

11. The combined frame assembly and suspension system defined in claim 1 wherein said first and second side portions of said first bracket include respective first surfaces that engage portions of a first surface of said structural member and respective second surfaces that engage portions of a second surface of said structural member.

12. The combined frame assembly and suspension system defined in claim 1 wherein said first and second side portions of said second bracket include respective first surfaces that engage portions of a first surface of said structural member and respective second surfaces that engage portions of a second surface of said structural member.

13. The combined frame assembly and suspension system defined in claim 1 wherein said first and second side portions of said first bracket include respective first surfaces that engage portions of a first surface of said structural member and respective second surfaces that engage portions of a second surface of said structural member, and wherein said first and second side portions of said second bracket include respective first surfaces that engage portions of a first surface of said structural member and respective second surfaces that engage portions of a second surface of said structural member.

14. The combined frame assembly and suspension system defined in claim 1 further including a spring suspension mechanism, and wherein said second bracket includes a panel that is engaged by said spring suspension mechanism.

15. The combined frame assembly and suspension system defined in claim 14 wherein said panel has an opening formed therethrough.

* * * * *